United States Patent [19]

Jones

[11] Patent Number: 4,893,722

[45] Date of Patent: Jan. 16, 1990

[54] COMPARTMENTED WASTE RECEPTACLE

[76] Inventor: Gregory H. Jones, 2300 W. Norwegian St., Pottsville, Pa. 17901

[21] Appl. No.: 228,525

[22] Filed: Aug. 5, 1988

[51] Int. Cl.⁴ .............................................. B65D 21/02
[52] U.S. Cl. .................................. 220/1 T; 220/23.83; 232/43.1
[58] Field of Search ...................... 220/1 T, 21, 22, 20, 220/23.83, 23.86; 232/43.1

[56] References Cited

U.S. PATENT DOCUMENTS

| | | | |
|---|---|---|---|
| 1,013,775 | 1/1912 | Hoffman | 220/1 T |
| 1,021,872 | 4/1912 | Kingsbury | |
| 1,238,090 | 8/1917 | Beringer | 220/1 T |
| 1,606,291 | 11/1925 | Burrows | |
| 1,618,366 | 2/1927 | Culling | |
| 1,769,317 | 7/1930 | Shaw | |
| 3,720,346 | 3/1973 | Cypher | |
| 3,904,218 | 9/1975 | Kostic | |
| 3,964,630 | 6/1976 | Getz | 220/1 T |
| 3,997,072 | 12/1976 | Guth | 220/1 T |
| 4,126,241 | 11/1978 | Klosk | 220/1 T |
| 4,643,380 | 2/1987 | Copeland | 220/1 T |
| 4,648,522 | 3/1987 | Wise | 220/1 T |
| 4,739,894 | 4/1988 | Bender | 220/1 T |

FOREIGN PATENT DOCUMENTS

| | | |
|---|---|---|
| 3531554 | 3/1987 | Fed. Rep. of Germany . |
| 1533841 | 11/1978 | United Kingdom . |

*Primary Examiner*—Joseph Man-Fu Moy
*Attorney, Agent, or Firm*—Benasutti & Murray

[57] ABSTRACT

A compartmented waste receptacle for segregating different types of waste, such as cans, paper, glass containers and the like. The receptacle has an upper compartment and a pair of lower compartments which are interconnected by two tubular chutes. The tubular chutes include a gasket located between the upper and lower compartments for limiting the speed within which the deposited articles land in the lower containers.

9 Claims, 3 Drawing Sheets

4,893,722

COMPARTMENTED WASTE RECEPTACLE

FIELD OF THE INVENTION

The present invention relates generally to waste receptacles and more particularly to a compartmented waste receptacle for containing different types of waste in separate compartments.

BACKGROUND OF THE INVENTION

One facet of the pollution control problem is waste disposal. Currently and in the past, society has periodically collected household and other waste, such as cans, paper, bottles and the like, and deposited them in dumps, land areas to be filled, and so on. The available waste depositories, however, are rapidly being filled by the ever increasing quantities of waste. Accordingly, society has recognized a need to develop other methods of waste disposal.

One of the waste disposal methods which is gaining increased attention involves reuse of the waste materials. This is commonly referred to as recycling. Recycling involves the processing of each different waste material to a reusable form. This, in turn, necessitates segregation of the various kinds of waste materials such that they can be processed or recycled.

Segregation of the waste can be accomplished at the home or at the recycling facility. Segregation at the recycling facility presents such a monumental task as to render this approach impractical. As a result, many towns have enacted legislature requiring mandatory separation of waste by the disposer, since segregation at the source is the ideal solution.

U.S. Pat. No. 3,720,346 issued to Cypher discloses a compartmented trash receptacle which includes a container with inner partitions which define separate trash compartments for different trash materials.

U.S. Pat. No. 3,904,218 issued to Kostic discloses a trash can unit including a plurality of identical trash cans which rest on a platform which is rotatably mounted on a base member. A common cover includes a plurality of windows, each corresponding to a different trash can.

Great Britain Pat. No. 1,533,841 issued to Goody et al. discloses a multi-compartment refuse bin including a main housing for slidably receiving a plurality of containers disposed side by side within the main housing.

The state of the art compartmented waste receptacles include containers for sorting refuse at the deposit site. However, problems arise with the conventional refuse sorters in that they require an excessive amount of floor space because of the use of juxtapositioned compartments. Therefore, a problem arises in areas where there is a limited amount of floor-space for trash containers which include multi-compartments in juxtaposition.

In addition, conventional containers for sorting refuse do not address the noise problems associated with their use in the home or commercial environments. The problem arises where communities require separation of cans, glass and other refuse. When glass or metal containers are deposited in the same bin, each deposit creates excessive noise as the glass or metal containers contact each other and the container walls. In commercial environments, such as restaurants, the level of noise throughout the dining area should be kept to a minimum so as not to interfere with the atmosphere of the evening.

Another problem associated with conventional waste receptacles is that they are open at the top, thus when glass containers are continuously deposited upon each other the likelihood of breakage increases. Therefore, the safety of those using the container decreases as glass particles may fly from the container and lodge in or lacerate a passerby.

SUMMARY OF THE INVENTION

By providing a compartmented waste receptacle which includes upper and lower compartments, the present invention will overcome problems and disadvantages inherent in prior art waste receptacles.

One object of the present invention is to provide a compartmented waste receptacle which is designed to inhibit the level of noise created upon depositing the same type of refuse in the same container.

Another object of the present invention is to provide a compartmented waste receptacle which is safe for use when depositing glass containers.

A further object of the present invention is to provide a compartmented waste receptacle which uses a minimum amount of floor space.

Still another object of the present invention is to provide a compartmented waste receptacle wherein waste can be separated and segregated at the deposit site.

The present invention relates to a compartmented waste receptacle for segregating different types of waste. The compartmented waste receptacle, in accordance with the present invention, includes an upper compartment and a lower compartment positioned beneath the upper compartment. The upper compartment includes transfer means which extends above the base of, and preferably into, the upper compartment for transferring waste from the upper compartment to the lower compartment. The transfer means also includes means for inhibiting the speed within which the waste is transferred from the upper compartment to the lower compartment.

DETAILED DESCRIPTION OF THE PREFERRED EMBODIMENT

Figure 1:
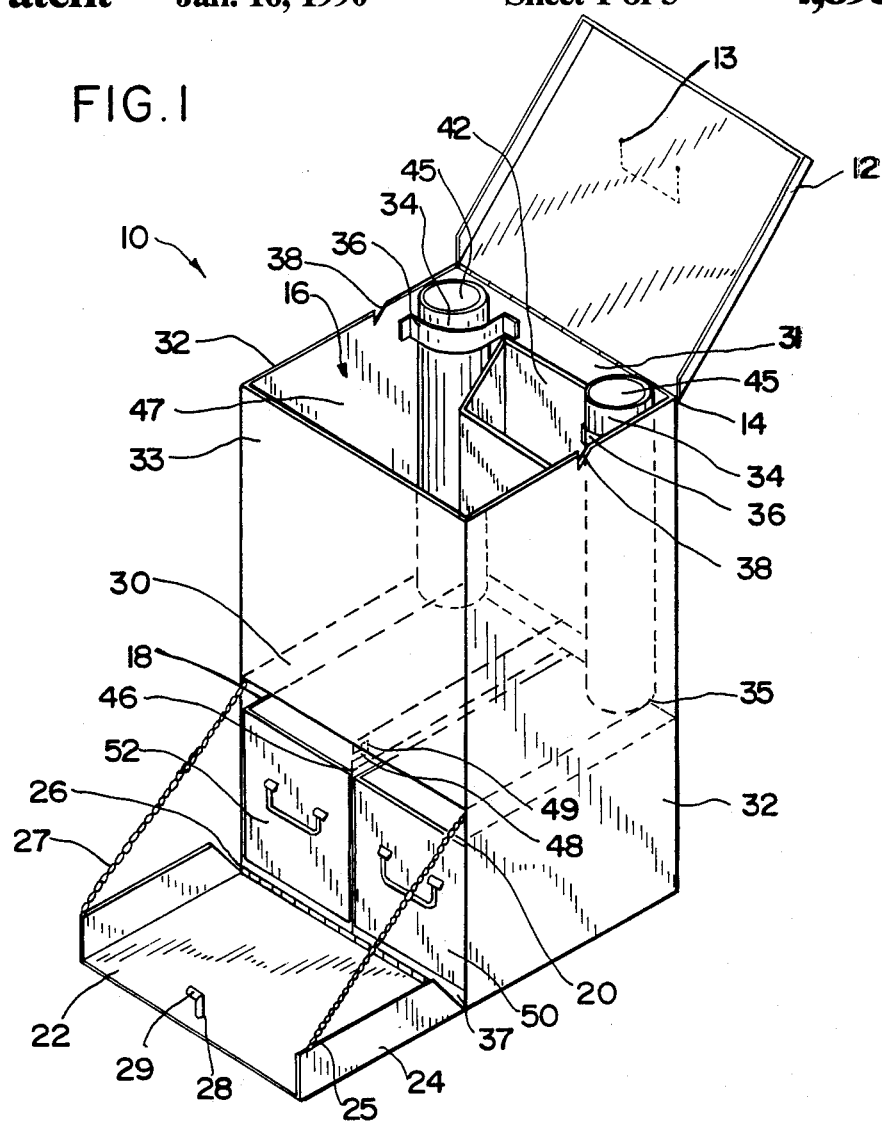
FIG. 1 is a perspective view of a preferred embodiment of a compartmented waste receptacle in accordance with the present invention.

Certain terminology will be used in the following description for convenience only and will not be limiting. The words "right", "left", "lower" and "upper" will designate directions in the drawings to which reference is made. The words "innwardly" and "outwardly" will refer to directions toward and away from, respectively, the geometric center of the device and designated parts thereof. The terminology will include the words above specifically mentioned, derivatives thereof and words of similar import.

Figure 2:
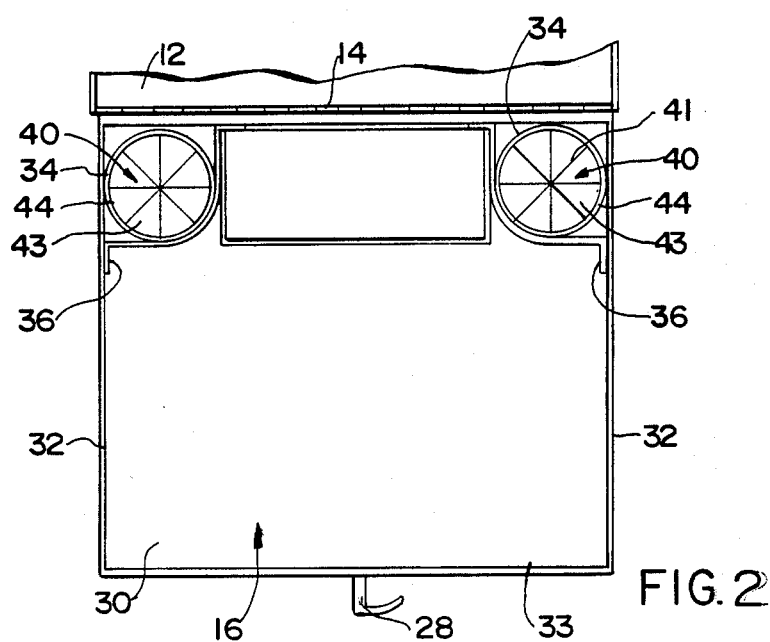
FIG. 2 is a partial top view of the preferred embodiment of the compartmented waste receptacle of FIG. 1.

Referring now to the drawings and, in particular, to FIGS. 1 and 2, a compartmented waste receptacle 10, in accordance with a preferred embodiment of the present invention, is shown. The receptacle 10 is separated into an upper compartment 16, a first lower compartment 18 and a second lower compartment 20. The upper compartment 16 is separated from the first 18 and second 20 lower compartments by a base 30. The interconnections between the base 30 and the upper 16 and lower compartments 18 and 20 include a suitable sealing means, such as RTV or other gasket material for preventing liquid seepage between compartments. Extending upwardly from the base 30 are a front wall 33, back wall 31 and side walls 32, the upper edges of which define an opening 47 to the upper compartment. Preferably the receptacle is made of $\frac{1}{8}''$ thick sheet metal, but other materials such as wood, plastic or fiberglass may be used for enhancing the cosmetic or structural characteristics of the receptacle.

A hinge 14 is connected to the upper edge of the back wall 31 and is further connected to a lid 12, thereby permitting the lid 12 to pivot so as to cover or close the upper compartment 16 or similarly open the upper compartment 16. A handle 13 is pivotally connected to the lid 12 to enable the user to readily lift the lid 12.

It is within the scope of the invention to use a sectional lid with plural covers to allow access to specific compartments. In addition, the hinge 14 can be located anywhere along the upper periphery of the receptacle. Furthermore, a foot pedal arrangement may be used to open the lid 22.

The lower compartments 18 and 20 can be covered by a lower compartment lid 22, which is pivotally connected to the bottom of the compartmented waste receptacle 10 by a hinge 26. The lower compartment lid 22 includes cover flanges 24, which extend upwardly from the sides thereof. The cover flanges 24 serve to inhibit the passing of unpleasant odors to the environment from the lower compartments 18 and 20. The cover flanges 24 may further include appropriate sealing means (i.e. rubber stripping not shown) for accomplishing this endeavor.

The lower compartment lid 22 further includes a handle type latch 28 for releasably securing the lid 22 in a closed position. In the closed position the latch 28 is slidably disposed within the latch receiving slot 48 and turned either clockwise or counter-clockwise so that the traversely extending finger 29 catches behind the notch 49 of the latch receiving slot 48.

Extending from the base 30 to the top 25 of the cover flanges 24 are chains 27. Given today's extensive use of easily marred vinyl flooring, the length of the chains 27 is such as to limit the rotational movement permitted by the lower compartment lid 22 so as to prevent the latch 28 from engaging the floor. By preventing the latch 28 from engaging the floor, the vinyl floor or other flooring will not be marred.

Located within the upper compartment 26 are two tubularly shaped chutes 34. The chutes 34 are fixedly located in the corners of the upper compartment 16 where the back wall 31 and the side walls 32 meet. The chutes are fixedly secured in the corners by the securing brackets 36. The base 30 includes a pair of apertures 44 which are correspondingly located at the ends 35 of the tubularly shaped chutes 34. The ends 35 of the tubularly shaped chutes 34 are secured to the base 30 at the apertures 44. While it is preferable to locate the chutes in the corners, the chutes or other transfer means may be located anywhere within or adjacent to the upper compartment.

In addition, located within the tubularly shaped chutes 34, adjacent the lower openings 35, is a gasket 40. The gasket is preferably made of a rubber material, but any known suitable material will do. The gasket is preferably round in shape and as a result of the slits 41, includes a plurality of inwardly extending tapered fingers 43 for allowing refuse to pass therethrough.

The diameter of the chutes 34 are sized such that they receive any standard bottle or can sold on the market today. Where the cans or glass containers' size prohibits depositing it through the chutes 34, the lower compartment lid 22 may be opened and the larger can or bottle may be deposited directly into either lower compartment containers 52 and 50.

Located between the tubularly shaped chutes 34 is an optional container 42, for receiving other types of refuse.

Located at the uppermost portion of the side walls 32 of the waste receptacle 10, are a pair of notches 38. The notches 38 are used to secure a conventional or standard plastic trash bag around the periphery of the uppermost portions of the front wall 33 and side walls 32. In addition, it is within the scope of the invention to further include a bar or rod located parallel to the front wall 33 with the ends thereof fixedly attached subjacent the notches 38. This bar adds additional support for the plastic trash bag.

The first lower compartment 18 is separated from the second lower compartment 20 by a bulkhead 46, which extends between base 30, back wall 31 and the bottom 37 of the receptacle 10. Located within the first lower compartment 18 is a first lower compartment container 52. Likewise, located within the second lower compartment 20 is a second lower compartment container 50. Each of these containers 52 and 50 are slidably disposed within the first and second lower compartments 18 and 20, respectively.

Figure 3:
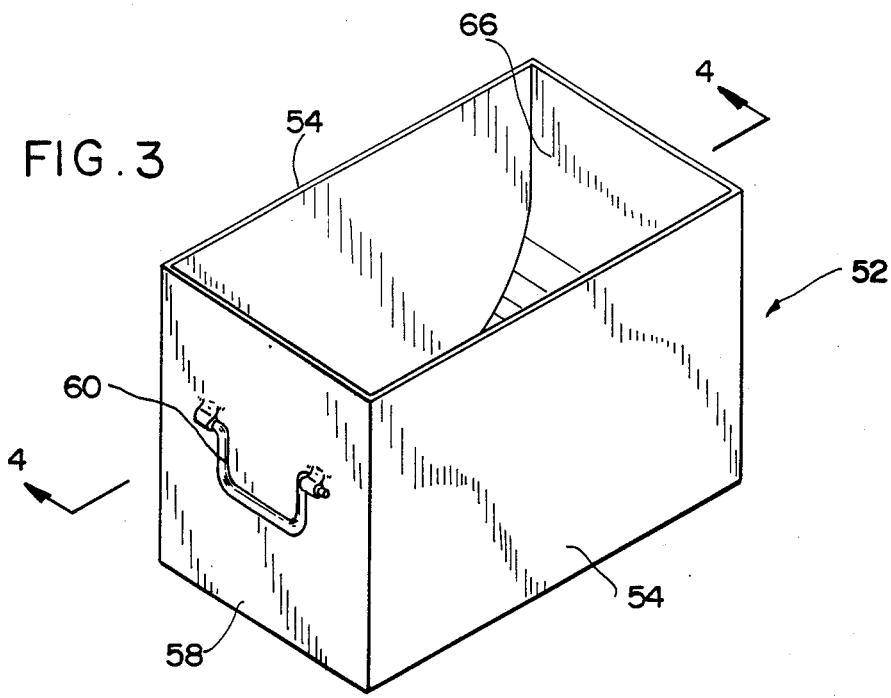
FIG. 3 is a perspective view of a lower compartment container.
Figure 4:
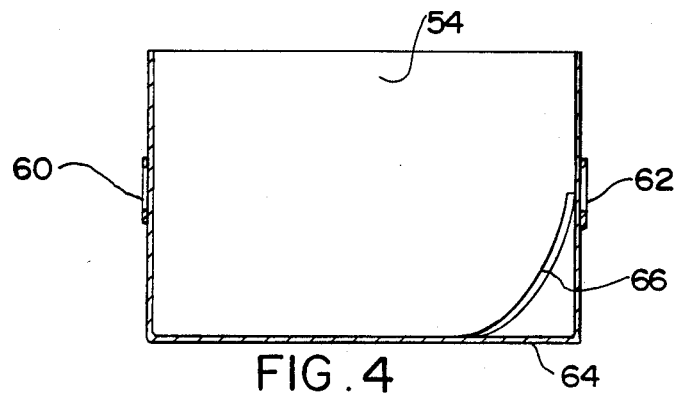
FIG. 4 is a cross-sectional view of the lower compartment container of FIG. 3.

Referring now to FIGS. 3 and 4, the first lower compartment container 52 is shown. The first lower compartment container 52 is identical to the second lower compartment container 50 and therefore the description hereinafter equally applies thereto. The first lower compartment 52 includes a base 64 having two side walls 54, a back wall 56 and a front wall 58 extending upwardly from the outer edges thereof. Pivotally located on the outer face of the front wall 58 and back wall 56 is a front handle 60 and a rear handle 62, respectively.

Concavely extending from the middle portion of the inner face of the back wall 56 to the inner portion of the base 64 is a kicker 66. The kicker 66 is preferably shaped to inhibit materials from collecting near the back wall 56 of the container.

Figure 5:
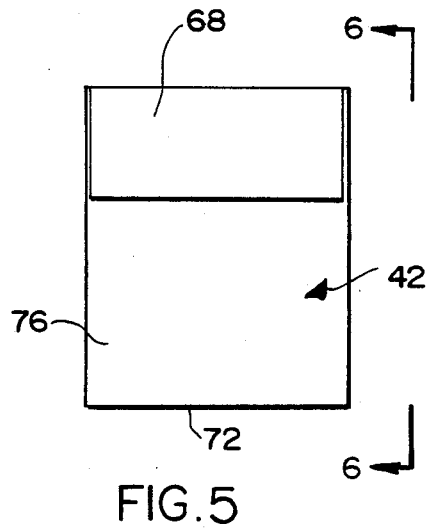
FIG. 5 is a plan view of a removable container.
Figure 6:
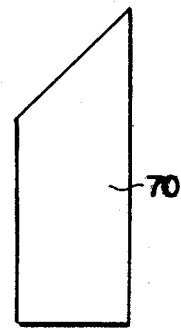
FIG. 6 is a side view of FIG. 5.

Referring now to FIGS. 5 and 6, an optional container 42 is shown. The container 42 includes an upwardly extending rear wall 68, which extends higher than the upwardly extending front wall 76. The container 42 further includes side walls 70 appropriately connected to the rear wall 68 and the front wall 76. The container 42 is inserted between the tubularly shaped chutes 34 adjacent the back wall 31 and is sized so as to be frictionally secured therein.

Figure 7:
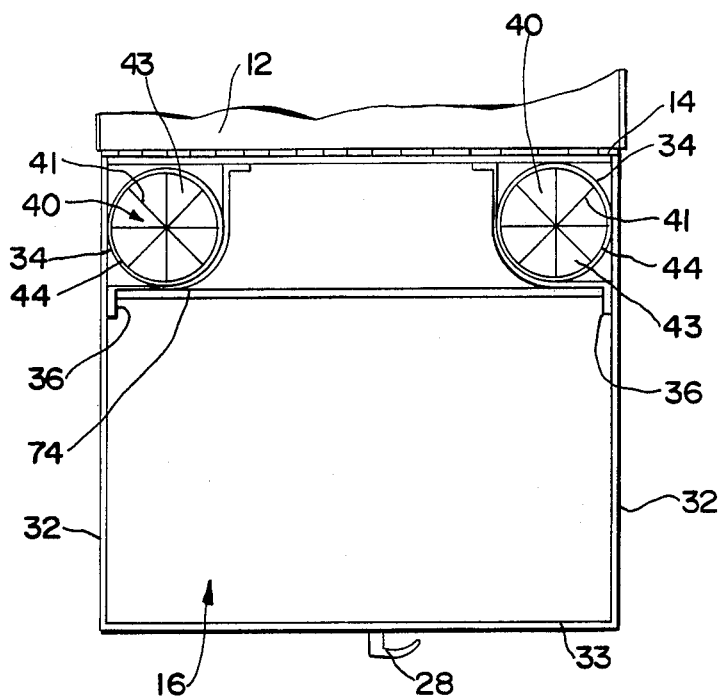
FIG. 7 is a partial top view of an alternative embodiment of the compartmented waste receptacle in accordance with the invention.

Referring now to FIG. 7, which shows a partial top view of an upper compartment of an alternative embodiment. In this embodiment, instead of an additional container 42, a bulkhead 74 extends parallel to the front wall 33 across the upper compartment 16, between the side walls 32 adjacent the tubularly shaped chutes 34. This arrangement is permanent as opposed to the arrangement of the container 42 in the preferred embodiment, which includes the option of being removed.

In use, any of the compartments or containers described supra can be used to receive any particular refuse or waste as the user prefers. However, for convenience of description only, the hereinafter described uses of the compartment waste receptacle 10, will depict specific types of waste located in specific containers. However, the invention is not limited thereto.

In normal use, the lid 12 is maintained in a closed position, covering the upper compartment 16, so as to limit the disbursement of unpleasant odors into the immediate environment. Likewise, the lower compartment lid 22 is also maintained in a closed position for the same purpose and to minimize the use of floor-space. The upper compartment 16, first lower compartment 18, second lower compartment 20 and the container 42 may each be lined with a conventional or standard plastic trash bag so as to keep the insides thereof free of waste and other extraneous matters which will emit a perpetual unpleasant odor. However, the use of trash bags are not necessary and may be omitted by the user, as in any conventional waste receptacle.

With respect to the container 42, a trash bag is inserted therein, with the upper edges of the bag wrapped around the upper outer periphery of the container. The container 42 is then slidably inserted between the tubularly shaped chutes 34, adjacent the back wall 31 and is frictionally maintained in this position. However, it is within the scope of the invention to secure the container permanently or to use other methods (such as a dovetail connection) for releasably securing the container within the upper compartment 16.

In order to line the upper compartment 16 with a standard trash bag, the bottom of the bag is inserted within the upper compartment 16 with the upper edges of the bag wrapped around the upper peripheral edges of the front wall 33 and side walls 32. The notches 38 are then used to secure the remaining portion of the trash bag. In the alternative embodiment of FIG. 7, the upper edge of the trash bag may be wrapped around the upper peripheral edge of the bulkhead 74.

With regard to the lower compartment containers 52 and 50, a conventional trash bag is deposited therein, with the upper edges of the bag being wrapped around the upper peripheral edges of the container walls, as is done in conventional trash cans. Upon locating the trash bag within the containers 52 and 50 they may be slidably inserted within the lower compartments 18 and 20, respectively. Once the containers 52 and 50, are inserted within the lower compartments 18 and 20, the lower compartment lid 22 can then be lifted and pivoted to the closed position and secured there, by the latch 28.

When depositing glass containers in the compartmented waste receptacle 10, the user approaches the receptacle and lifts the lid 12, by the handle 13, and places the glass container within the appropriate tubular chute 34 and releases it. As the glass container descends within the chute, it will encounter the gasket 40. When the glass container meets the gasket 40, the tapered fingers 43, created by the slits 41, will deflect downwardly allowing the glass container to pass therethrough, at a speed and acceleration significantly less than that if the gasket were not included. Therefore, the glass container will not strike the bottom of the lower compartment container and make excessive noise nor will the glass container crash into other glass containers at excessive speeds. Therefore, the risk of breakage is greatly reduced. Moreover, since the lower compartment containers are surrounded and enclosed, any breakage that may result will not endanger the user or those who pass by.

As previously described, in order to prevent the glass containers from remaining near the back wall 56 of the lower compartment containers 52 and 50, a kicker 66 guides the glass containers towards the front wall 58. The kicker may also be positioned within the lower compartment itself rather than in the container.

When depositing metal cans within the waste receptacle 10, the same procedure is used as that in depositing glass containers described supra. However, a different gasket material may be used, as metal cans are weighted differently. Therefore, a gasket of different material may be necessary to acquire the necessary speed-reducing characteristics.

Additionally, the means for inhibiting the speed within which the waste is transferred through the transfer means into a lower compartment may be such that the waste such as bottles or cans is temporarily stored within the transfer means and subsequently released into the lower compartment. For example, as in FIGS. 1 and 2, where the transfer means comprises a chute 34 and an inhibiting means such as a gasket 40 positioned at the lower end of the chute, the gasket 40 may be sufficiently rigid to allow the waste such as bottles or cans to be temporarily stacked or positioned within the chute and sufficiently pliable to allow a part of or all of the temporarily stored waste to be transferred into the lower compartment upon application of sufficient pressure upon the stack of bottles or cans. In other words, as each additional bottle or can is disposed of through the upper opening 45 of the chute 34, the bottle or can resting on the gasket 40 is pushed through the gasket 40 into a lower compartment. Alternatively, the inhibiting means may be a shutter which is mechanically releasable to allow the temporarily stored waste to pass into a lower compartment.

An odor-reducing means for containing the odor of the temporarily stored waste (not shown in the Figures) may be positioned at the upper opening 45 of the transfer means. For example, where the transfer means is a chute 34, as shown in FIGS. 1 and 2, having an inhibiting means such as gasket 40 positioned at the lower opening 35 of the chute 34 the odor-reducing means may be a pliable gasket made of rubber or other suitable material. Likewise, the odor-reducing means may be a mechanical shutter.

To remove the first and second lower compartment containers 52 and 50, the latch 28 is turned and the lower compartment lid 22 is pivoted away from the front wall 33 of the receptacle. When the lower compartment lid 22 has reached the maximum pivot point, which is dictated by the chains 27, the first and second lower compartments 52 and 50 may be slidably removed by pulling on the handle 60. After the lower compartment container is removed from the lower compartment, the user may grab the second handle 62, to lift and carry the lower compartment container to the appropriate destination.

The container 42 is optional and therefore, may be used if desired. One use of the container 42 is to store newspapers therein. In the alternative embodiment, a bulkhead is permanently installed across the side walls 32 of the upper compartment 16 adjacent the chutes 34. The space located between the bulkhead 74 and the back wall 31, may also be used to sore newspapers or other desired waste.

The remaining compartment is the upper compartment 16, all remaining waste products that have not been stored in the three previously described areas may therefore be deposited therein.

Preferably the upper opening 45 of the chutes 34 or other means for transfering waste into a lower compartment are disposed at a height and in a manner that is easily accessible to a person disposing waste in the receptacle and does not require the person to bend over to deposit wastes into different compartments. This may be accomplished by locating the upper openings 45 of the chutes 34 or transfer means at a height above the base 30 of the upper compartment 16. In a preferred embodiment, the upper opening of the chute or transfer means is positioned above the base of the upper compartment and below or at the same level or height as the opening of the upper compartment. As shown in FIG. 1, in a preferred embodiment the upper opening 45 of the chutes 34 is at the same height as the opening 47 of the upper compartment 16. Such a configuration has the additional beneficial advantage of preventing waste deposited in the upper compartment from passing or seeping into a lower compartment.

It will be recognized that it is within the scope of the invention to provide a compartmented waste receptacle having a plurality of upper compartments and a plurality of lower compartments having chutes or other transfer means through the base or bases of one or more of the upper compartments.

Since the compartments of the waste receptacle 10 are positioned in an upper and lower configuration, the floor space needed is significantly reduced. In addition, the use of gaskets in the chutes 34, greatly reduces the descending speed of the deposited articles and therefore, significantly decreases any impact noise created when the deposited articles encounter the lower containers and decrease the chance of breakage. Furthermore, since the lower compartments are located beneath the upper compartment and the gasket 40 and cover flanges 24 act to limit the odor level, any dissipating odors are significantly reduced. Finally, since the lower compartments are completely surrounded and enclosed, any particles of glass which result from a broken glass container will not leave the receptacle, thereby creating a safer depository environment.

While the preferred embodiment of the invention has been described, other embodiments may be devised and modification may be made thereto without departing from the spirit of the invention and the scope of the appended claims. For instance, a can crusher may be mounted on the side of the receptacle, so that more cans can be deposited therein. Also a bottle opener may be mounted on the side of the receptacle for convenience purposes.

What is claimed is:

1. A compartmented waste receptacle for segregating different types of waste comprising:
    a bottom including two side walls and a back wall extending upwardly therefrom;
    said bottom further including a lower compartment lid having a first end and a second end, said second end being pivotally secured to said bottom;
    a base positioned above said bottom such that the distance between said base and said bottom is less than the distance between said first and second ends of said lower compartment lid;
    said base extending between said two side walls and said back wall and further including a front wall extending upwardly therefrom to substantially the same height as said other walls;
    said base further including a first aperture positioned adjacent one of said side walls and said back wall and a second aperture positioned adjacent the other of said side walls and said back wall;
    said apertures being surrounded by a chute which extends upwardly therefrom to the same height as said walls;
    a first and a second lower compartment container each disposed between said base and said bottom and positioned beneath said first and second apertures, respectively; and
    an upper compartment lid pivotally secured to an upper edge of one of said walls.

2. The compartmented waste receptacle of claim 1 further including a container frictionally secured between said chutes.

3. The compartmented waste receptacle of claim 1 further including a notch i an upper edge of each of said side walls.

4. The compartmented waste receptacle of claim 1 further including a bulkhead securely positioned parallel to said front and back wall and extending between said side walls adjacent said chutes.

5. The compartmented waste receptacle of claim 1 further including a bulkhead extending between said base, said bottom and said back wall and securely positioned between said first and second lower compartment containers.

6. The compartmented waste receptacle of claim 1 wherein said lower compartment lid further includes a latch for securing said lower compartment lid in a closed position.

7. The compartmented waste receptacle of claim 1 wherein said chutes further include a gasket positioned therein.

8. The compartmented Waste receptacle of claim 1 wherein said lower compartment lid is pivotally secured to said bottom by a hinge and further including means for limiting the pivotal range of said lower compartment lid to a value less than that permitted by said hinge.

9. The compartmented waste receptacle of claim 1 wherein said lower compartment containers includes a kicker for guiding deposited waste.

* * * * *